(12) United States Patent
Confalonieri et al.

(10) Patent No.: US 12,412,614 B2
(45) Date of Patent: Sep. 9, 2025

(54) ROW TRACKING FOR ROW HAMMER MITIGATION

(71) Applicant: Micron Technology, Inc., Boise, ID (US)

(72) Inventors: Emanuele Confalonieri, Segrate (IT); Yaw Fann, San Jose, CA (US); Yu-Sheng Hsu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 167 days.

(21) Appl. No.: 18/237,786

(22) Filed: Aug. 24, 2023

(65) Prior Publication Data
US 2024/0071459 A1    Feb. 29, 2024

Related U.S. Application Data

(60) Provisional application No. 63/401,697, filed on Aug. 28, 2022.

(51) Int. Cl.
*G11C 11/40* (2006.01)
*G06F 3/06* (2006.01)
*G11C 11/406* (2006.01)

(52) U.S. Cl.
CPC .......... *G11C 11/406* (2013.01); *G06F 3/0623* (2013.01); *G06F 3/0658* (2013.01); *G06F 3/0659* (2013.01); *G06F 3/0683* (2013.01)

(58) Field of Classification Search
CPC ............... G11C 11/406; G11C 16/08; G11C 16/3427; G11C 16/3418; G11C 11/40603; G06F 3/0623; G06F 3/0658; G06F 3/0659; G06F 3/0683; G06F 21/79
See application file for complete search history.

(56) References Cited

U.S. PATENT DOCUMENTS

| 2023/0236735 | A1 | 7/2023 | Ayyapureddi et al. |
| 2023/0236968 | A1 | 7/2023 | Gieske et al. |
| 2024/0304234 | A1* | 9/2024 | You ..................... G06F 12/0246 |

FOREIGN PATENT DOCUMENTS

CN    116486884 A    7/2023

* cited by examiner

*Primary Examiner* — Xiaochun L Chen
(74) *Attorney, Agent, or Firm* — Brooks, Cameron & Huebsch, PLLC

(57) ABSTRACT

A control mechanism may be implemented in a back-end of a memory sub-system to refresh rows of a memory device. Rows of the memory device can be refreshed based on a quantity of times the rows have been updated in a duration of time. Rows of the memory device can also be updated based on a duration of time between receipt of the activation command for the row and a pre-charge command for the row. Row of the memory device clan further be updated utilizing a pair of counters that implement a ping pong mechanism to retain data between different consecutive durations of time.

20 Claims, 11 Drawing Sheets

ROW TRACKING FOR ROW HAMMER MITIGATION

PRIORITY INFORMATION

This application claims the benefit of U.S. Provisional Application No. 63/401,697, filed on Aug. 28, 2022, the contents of which are incorporated herein by reference.

TECHNICAL FIELD

Embodiments of the disclosure relate generally to memory sub-systems, and more specifically, relate to tracking rows for row hammer mitigation.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
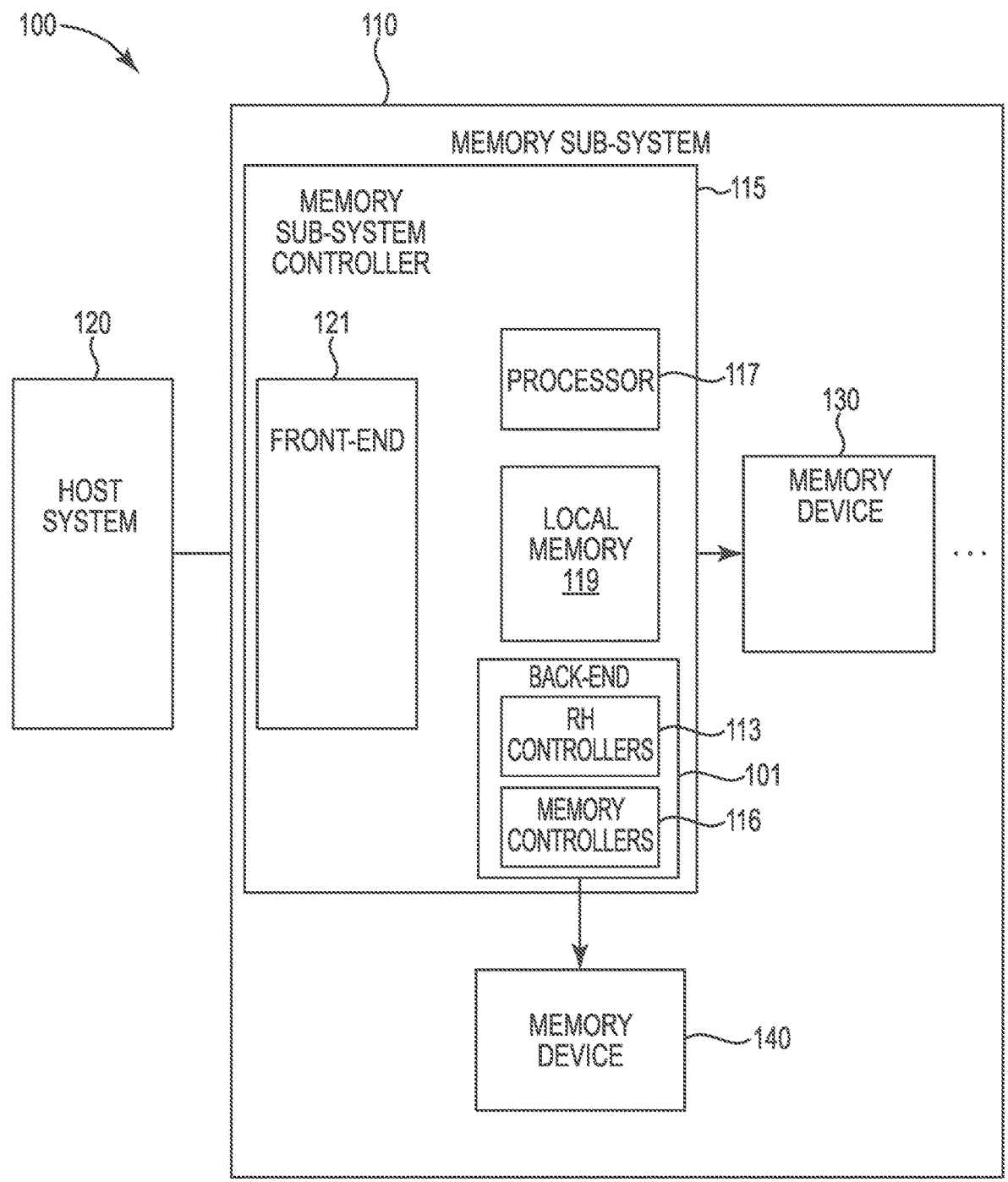
FIG. 1A is a block diagram of a computing system that includes a memory sub-system in accordance with some embodiments of the present disclosure.

Aspects of the present disclosure are directed to tracking rows for row hammer, in particular to memory sub-systems that comprise a controller to mitigate row hammer attacks. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

The front-end (e.g., front-end interface) and/or the back-end of a memory sub-system can include a row hammer mitigation mechanism to mitigate row hammer attacks. In various memory sub-systems, the front-end of the memory sub-system can be connected to a media controller which can then access a variety of media types including DRAM, 3DXP, and/or NAND, among others (e.g., emerging memories). The media controller can be referred to as the back-end of the memory sub-system.

As used herein, row hammer attacks access memory cells in a row of the memory array to leak the charge stored in the row of memory cells to an adjacent row of memory cells. For instance, memory cells corresponding to a particular row can be affected by a row hammer attack. Row hammer refers to undesirable changes in capacitor voltages of memory cells corresponding to a row neighboring a row being frequently accessed. A row hammer attack may be employed to intentionally alter data stored in memory by repeatedly accessing a particular row in rapid succession. The goal of a row hammer attack may be to corrupt data in an adjacent row that is not accessible.

For instance, a first row being adjacent to a second row may be accessed repeatedly over a period of time. Accessing the first row repeatedly may leak voltage from memory cells coupled to the second row to memory cells coupled to the first row. The voltage leakage may cause data corruption to data stored in the memory cells coupled to the second row. Row hammer attacks corrupt data stored in memory cells coupled to the second row by activating the memory cells coupled to the first row where the first row is adjacent to the second row. In some examples, the first row and the second row may not be adjacent but may be within a number of rows of each other.

As used herein, memory cells and/or rows can be adjacent to each other if the memory cells and/or rows are physically located next to each other in a memory array or if there is physical proximity sufficient to allow for the leakage of a charge from memory cells coupled to a row to different memory cells coupled to a different row. A row of memory cells can be next to a different row of memory cells if the addresses of the rows are consecutive and/or if there are no other rows between the adjacent rows. Memory cells may be adjacent to each other if the memory cells are coupled to rows that are adjacent to each other.

Due to various physical effects of shrinking manufacturing process geometries, the row hammer threshold (RHT) of memory sub-systems has decreased to a level at which applications running on a host of a computer system can inadvertently corrupt their own data or the data of different applications sharing the same system's memory. As used herein, the RHT is a threshold quantity of accesses of a row of memory cells after which the memory cells in the row leak a charge.

Various row hammer detector algorithms (e.g., address sampling, priority content addressable memory) may be probabilistic and thus may not guarantee perfect (e.g., complete, accurate, and/or precise) prevention of data corruption. If an aggressor knows sufficient details of these existing row hammer detection methods and their implementation mechanisms, the aggressor can attack their weaknesses to bypass or break them and corrupt data. Various row hammer detector algorithm implementations require an amount of memory and operating power that are too high to be practically useful. Various row hammer detector algorithms may also track accesses to a row in a given window of time. However, data may be lost between the end of each window and the start of the next window which can provide vulnerabilities to row hammer attacks.

Row hammer detection can include determining which addresses of a memory sub-system are accessed most frequently and refreshing the identified addresses. Determining which addresses are accessed most frequently can include storing each address that is accessed and counting which addresses are accessed most. However, storing each address that is accessed may not be feasible given memory constraints. Keeping a count for each address that is received may also not be feasible due to memory constraints specially if each address that is received is a different address. Mesa-Grise (e.g., Mesa-Grise algorithm) can be used to identify the most frequent items in a finite data stream. For example, the Mesa-Grise can be used to identify elements that occur more than a predefined amount of time. For example, the Mesa-Grise can be used to identify elements (e.g., addresses) that occur more than five times in a stream of addresses received from a host.

Addresses can be stored in a dictionary to detect vulnerabilities to row hammer attacks. If the dictionary contains the address, then we can store a count for the given address. If the dictionary does not include the address and there is space in the dictionary, then the address can be added to the dictionary and a corresponding count can be set to 1. However, the count can be reset after a threshold duration of time. Resetting the count can cause a loss of data which can provide a vulnerability to row hammer attacks.

Aspects of the present disclosure address the above and other deficiencies by implementing a control mechanism in a back-end of a memory sub-system to refresh rows of the memory. Aspects of the present disclosure can utilize multiple counters to track accesses to a row over a duration of time such that data is retained between the end of a first duration of time and a beginning of a next duration of time. Aspects of the present disclosure can also utilize a duration of time between a receipt of an activation command and a receipt of a pre-charge command to determine when to refresh a row of a memory device to mitigate row hammer attacks. Although the examples provided herein are in the context of row hammer attacks, the examples can also be applied to the loss of data due to memory cell leakage. The memory leakage can be caused by accessing the memory cells or adjacent memory cells at a greater rate than the RHT, among other causes of memory leakage from memory cells.

Interfaces such as peripheral component interconnect express (PCIe), compute express link (CXL), cache coherent interconnect for accelerators (CCIX), etc. allow connecting a variety of memory devices to a host system. The combination of interfaces and memory technology improvements can allow for deploying "far memory," which can consist of system memory (e.g., memory devices) being implemented behind a front-end of a memory sub-system such as PCIe, CXL, CCIX, GenZ., etc. As used herein, the front-end of the memory sub-system can also be referred to as an interface of the memory sub-system or as a front-end of a controller of the memory sub-system. As used herein, the front-end of the memory sub-system can comprise hardware and/or firmware configured to receive data (e.g., requests and/or data) and provide the data to a back-end of the memory sub-system. The back-end of the memory sub-system can comprise hardware and/or firmware to receive the data (e.g., requests and/or data) from the front-end of the memory sub-system. The back-end can perform the requests provided from by host on the memory devices of the memory sub-system.

FIG. 1A is a block diagram of a computing system that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMN) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

In some embodiments, the interface can be managed with compute express link (CXL) protocols and be coupled to the host 120 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND). The non-volatile memory devices can also include DRAM and FeRAM, among other examples of non-volatile memory devices.

Each of the memory devices 130, 140 can include one or more arrays of memory cells. One type of memory cell, for example, includes single level cells (SLC) which can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system 110 includes the memory sub-system controller 115. The memory sub-system controller 115 includes a front-end 121, a back-end 101. The front-end 121 can be utilized to communicate with the host system 120. The front-end 121 can convert the commands received from the host system into command instructions to access the memory device 130 and/or the memory device 140 as well as convert responses associated with the memory device 130 and/or the memory device 140 into information for the host system 120. In some embodiments, the front-end 121 can include special purpose circuitry in the form of an ASIC, FPGA, state machine, and/or other logic circuitry that can allow the front-end 121 to orchestrate and/or perform operations.

The back-end 101 can communicate with the memory devices 130, 140 to perform operations such as reading data, writing data, or erasing data at the memory devices 130, 140 and other such operations. Although the back-end 101 is shown as being included in the memory sub-system controller 115, the back-end 101 can be separate from the memory sub-system controller 115. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. The memory sub-system 110 can include a central controller which comprises the processor 117 and the local memory 119.

In some embodiments, an external controller (e.g., memory sub-system controller 115) can externally manage the memory device 130 (e.g., perform media management operations on the memory device 130). In some embodiments, a memory device 130 is a managed memory device, which is a raw memory device combined with a local controller for media management within the same memory device package. An example of a managed memory device is a managed NAND (MNAND) device.

The back-end 101 can include controllers 113 (e.g., row hammer controllers 113) and memory controllers 116. Although not shown in FIG. 1 so as to not obfuscate the drawings, the controllers 113 can include various circuitry to facilitate determining when to determine when to refresh a row of the memory devices 130, 140. In some embodiments, the controllers 113 and/or the memory controllers 116 can include special purpose circuitry in the form of an ASIC, FPGA, state machine, and/or other logic circuitry that can allow the controllers 113 and/or the memory controllers 116 to orchestrate and/or perform operations to selectively refresh rows of the memory devices 130, 140 based on a row hammer threshold (RHT).

In previous approaches, activation commands to banks of the memory devices 130, 140 can be tracked. If the quantity of activation commands to a bank is greater than a threshold (e.g., RHT), then a controller of the back-end 101 of the memory sub-system 110 can issue a refresh command to a bank of the memory devices 130, 140 to protect the integrity of the data stored in the bank of the memory devices 130, 140.

In a number of embodiments, activation commands for rows of the memory devices 130, 140 can be tracked. Refresh commands can be provided to target row addresses corresponding to rows of the memory devices 130, 140. The controllers 113 can provide signals to memory controllers 116 of the back-end 101 to cause the memory controllers 116 to issue refresh commands to target row addresses. The controllers 113 can issue refresh commands, by providing the signals to the memory controllers 116, when a target bank is in an idle state.

Activation commands can be tracked for a refresh window. For example, a quantity of activation commands received in a refresh window (e.g., duration of time) can be tracked to determine whether they exceed a threshold quantity of activation commands. The activation commands can also be tracked to determine whether a duration of time between the activation commands and corresponding pre-charge commands exceeds a threshold. As used herein, the refresh window describes a duration of time for which activation commands to rows of the memory device 130, 140 are tracked. Counters corresponding to row addresses can be reset each refresh window.

The activation commands are tracked utilizing a space saving algorithm originally developed for online monitoring of data streams. A quantity of activation commands can be tracked and the corresponding row addresses can also be tracked in dedicated memory (SRAM) to determine when to refresh corresponding rows of the memory device 130, 140. In various examples, the duration of time between receipt of the activation commands and receipt of the corresponding pre-charge commands can also be tracked to determine when to refresh corresponding rows of the memory devices 130, 140.

The quantity of activation commands and the duration of time between receipt of the activation commands and receipt of the corresponding pre-charge commands can be tracked utilizing counters. The counters can comprise memory which is utilized to store a value corresponding to the quantity of activation commands and/or a duration of time between receipt of the activation commands and receipt of the corresponding pre-charge commands.

The counters can comprise multiple counters utilized to track a quantity of activation commands received for a row address corresponding to a row of the memory devices 130, 140. For example, two counters (e.g., a first counter and a second counter) can be utilized to track activation commands to a row of the memory devices 130, 140. The first counter and the second counter can be reset at different times.

The duration of time between the resetting of the first counter and the second counter and the resetting of the second counter and the first counter can be equal to the refresh window. For example, the refresh window can begin after a resetting of the second counter, can span the resetting of the first counter, and can conclude with the resetting of the second counter. In various instances the duration of time between the resetting of the first counter and the second counter can be equal to half of the refresh window. The resetting of the first counter and the second counter, with regards to the refresh window, can be predefined and can be fixed such that it does not change based on the quantity of activation commands received. The use of multiple counters to track activations commands for a particular row of the memory devices 130, 140 can be referred to "pin-pong."

The counters can be incremented together even if they are reset separately. Multiple counters are utilized to track activation commands for a row of the memory devices 130, 140 to refrain from losing data between the end of first refresh window and a start of a second refresh window. A portion of the counts are retained between refresh windows even though at least one of the counters is reset between refresh windows.

Figure 1B:
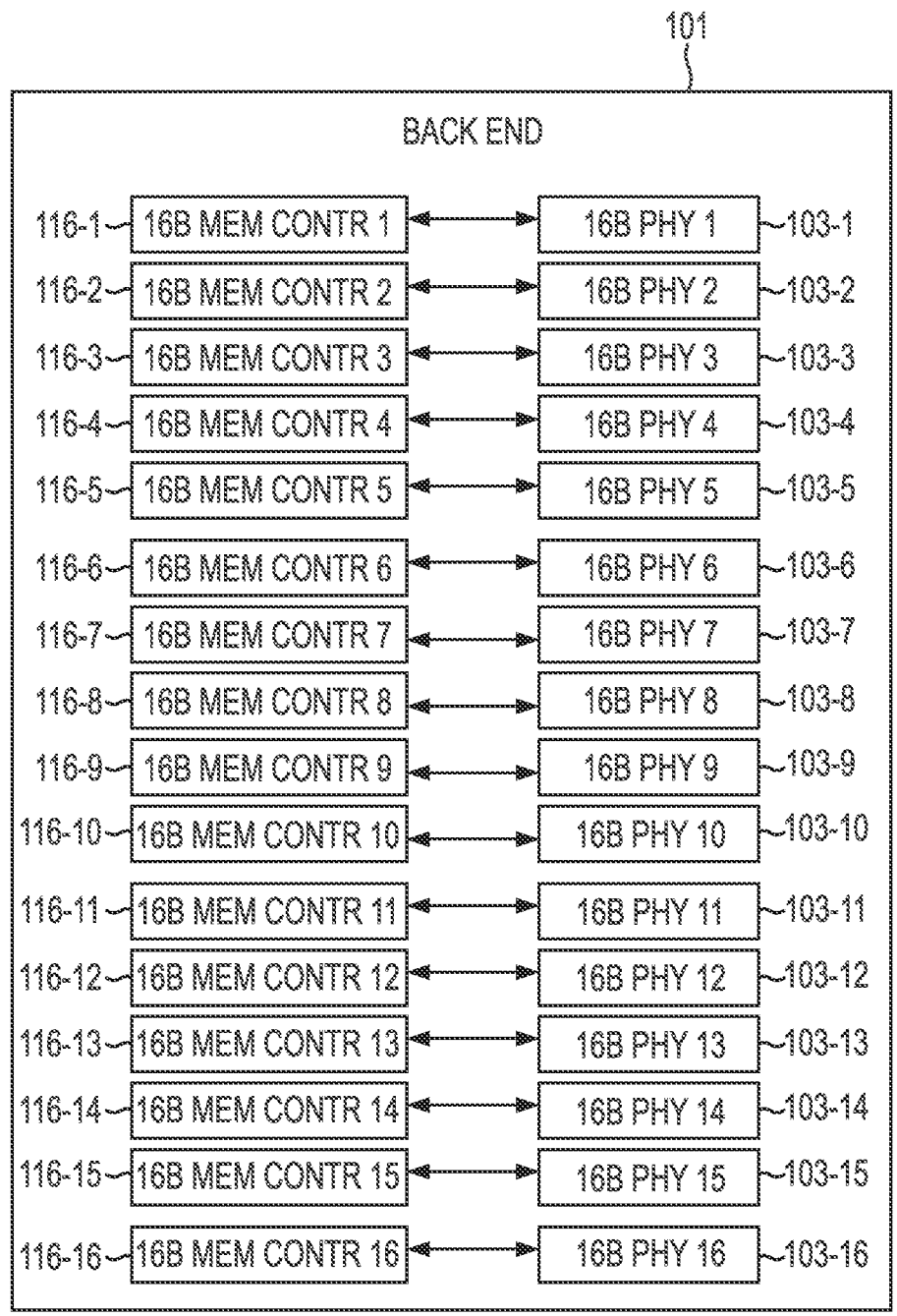
FIG. 1B is a block diagram of a back-end of a memory sub-system in accordance with some embodiments of the present disclosure.

FIG. 1B is a block diagram of a back-end 101 of a memory sub-system in accordance with some embodiments of the present disclosure. The back-end 101 comprises memory controllers 116-1, 116-2, 116-3, 116-4, 116-5, 116-6, 116-7, 116-8, 116-9, 116-10, 116-11, 116-12, 116-13, 116-14, 116-15, 116-16, referred to as controllers 116. The controllers 116 can be coupled to interfaces 103-1, 103-2, 103-3, 103-4, 103-5, 103-6, 103-7, 103-8, 103-9, 103-10, 103-11, 103-12, 103-13, 103-14, 103-15, 103-16, referred to as interfaces 103. Each of the controllers 116 can be coupled to a different one of the interfaces 103.

The rate of the interfaces 103 can be 4267 mpbs (megabytes per second). The interfaces 103 can be utilized to communicate with one or more memory devices coupled to the back-end 101.

The memory controllers 116 can be coupled to a central controller (not shown) of the memory sub-system. The central controller can act as a master on the local interconnect, while the memory controllers 116 act as slave instances of the central controller. Each of the controllers 116 can be coupled to a different controller (e.g., row hammer controller).

Figure 2:
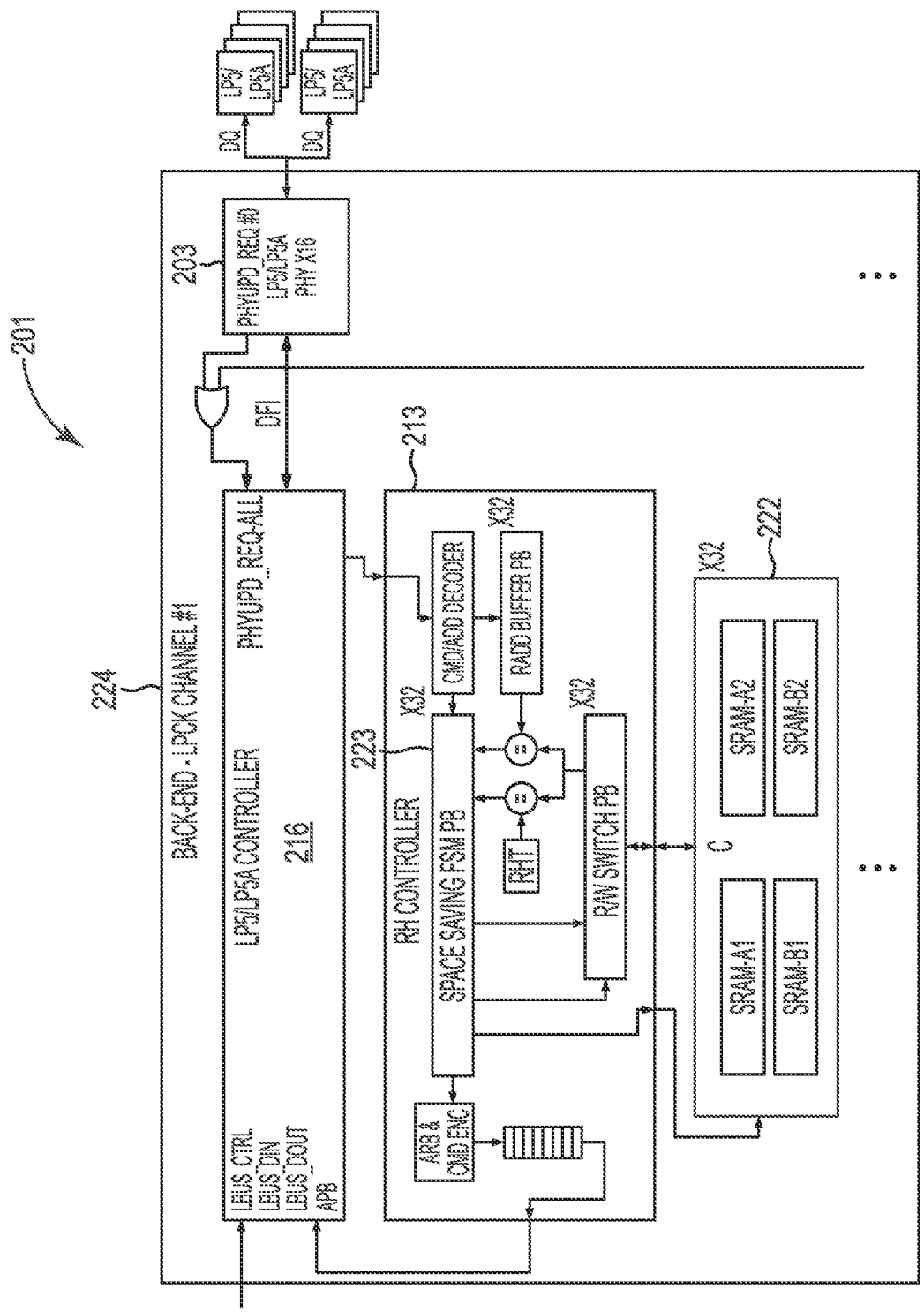
FIG. 2 is a block diagram of a back-end of a memory sub-system comprising a row hammer controller in accordance with some embodiments of the present disclosure.

FIG. 2 is a block diagram of a back-end 201 of a memory sub-system comprising a row hammer controller 213 in accordance with some embodiments of the present disclosure. The back-end 201 of the memory sub-system comprises a memory controller 116, a row hammer controller 213, memory 222, and an interface 203. The memory 222 can be referred to as row hammer memory 222.

The back-end 201 can comprise multiple channels. The back-end 201 is shown as comprising channel 224. The channels of the back-end 201 can be a low-power chip kill (LPCK) channel. The channels of the back-end 201 can be utilized to perform error correction on data read from the memory devices coupled to the back-end 201 via the interface 203.

Each of the memory controllers 216 can be coupled to a different row hammer controller 213. Each of the row hammer controllers 213 can be coupled to a different memory 222. The row hammer controller 213 can access data from the memory controller 216. For example, the row hammer controller 213 can access commands from the memory controller 216. The activation commands can be generated by the memory controller 216 and provided to the memory devices to read data from the memory devices or to write data to the memory devices.

Figure 7:
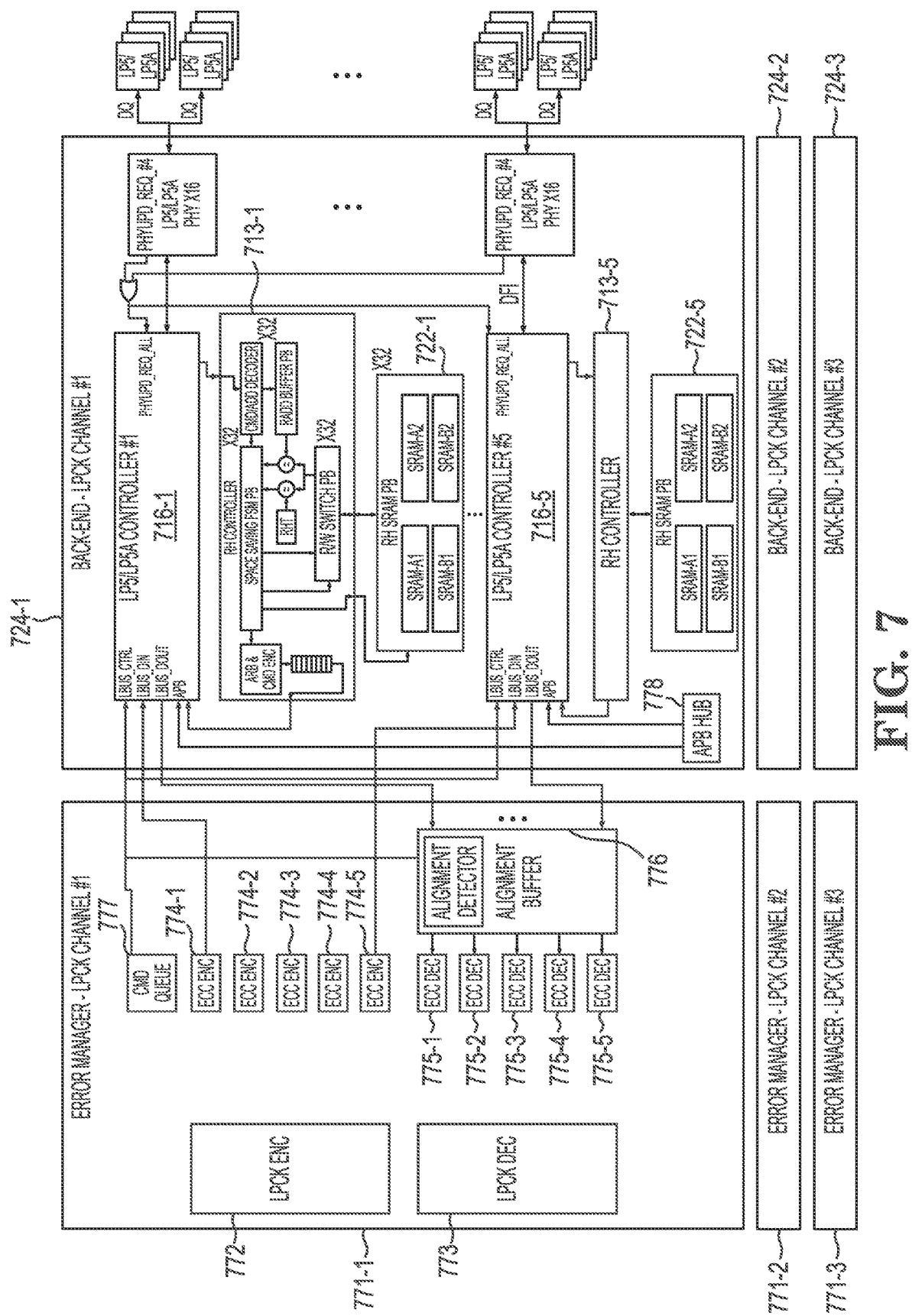
FIG. 7 is a block diagram of a back-end of a memory sub-system in accordance with some embodiments of the present disclosure.

In various examples, each channel, including channel 224, can comprise a memory controller 216, a row hammer controller 213, and memory 222. Each of the channels of the back-end 201 can comprise multiple memory controllers 216, row hammer controllers 213, and memory 222 as shown in FIG. 7.

The row hammer controller 213 can comprise circuitry 223. The circuitry 223 can be configured to determine when to refresh rows of the memory devices. The row hammer controller 213 can provide a signal to the memory controller 216 requesting a refreshing of the rows of the memory devices.

The memory 222 can store counters utilized to track activation commands and/or pre-charge commands. The memory 222 can associate row addresses with the counters such that the row counters can correspond to rows of the memory devices having the row addresses.

The row hammer controller 213 can capture row address information corresponding to the activation commands from the memory controller 216. For example, row hammer controller 213 can decode activation commands utilizing circuitry (e.g., CMD/ADD Decoder). Row address information can be captured, by circuitry 223, from the decoded activation commands. The row address information (e.g., row addresses) can be temporarily stored in a dedicated buffer (e.g., RADD Buffer pb). The row address information, corresponding to the activation commands, can be compared with row addresses, corresponding to counters, stored in the memory 222. In various examples, the memory 222 can comprise SRAM. The circuitry 213 can be, for example, a state machine. Each row hammer controller 213 can comprise 32 state machines, in the LPA1 case. The commands generated by the state machines of the row hammer controller 213 can be collected in a FIFO structure before being provided to the memory controller 216.

The row hammer controller 213 can generate refresh commands when a quantity of activation commands to a row address exceeds a threshold. The row hammer controller 213 can also generate refresh commands when the duration of time between receipt of the activation command and receipt of a corresponding pre-charge command exceeds the threshold. In various instances, a first threshold can be compared against the quantity of activation commands received for a row address while a second threshold can be compared against a duration of time between receipt of activation commands and receipt of corresponding pre-charge commands for a row address. In various examples a single threshold can be compared against the quantity of activation commands received for a row address and a duration of time between receipt of the activation commands and receipt of the corresponding pre-charge commands.

Figure 3:
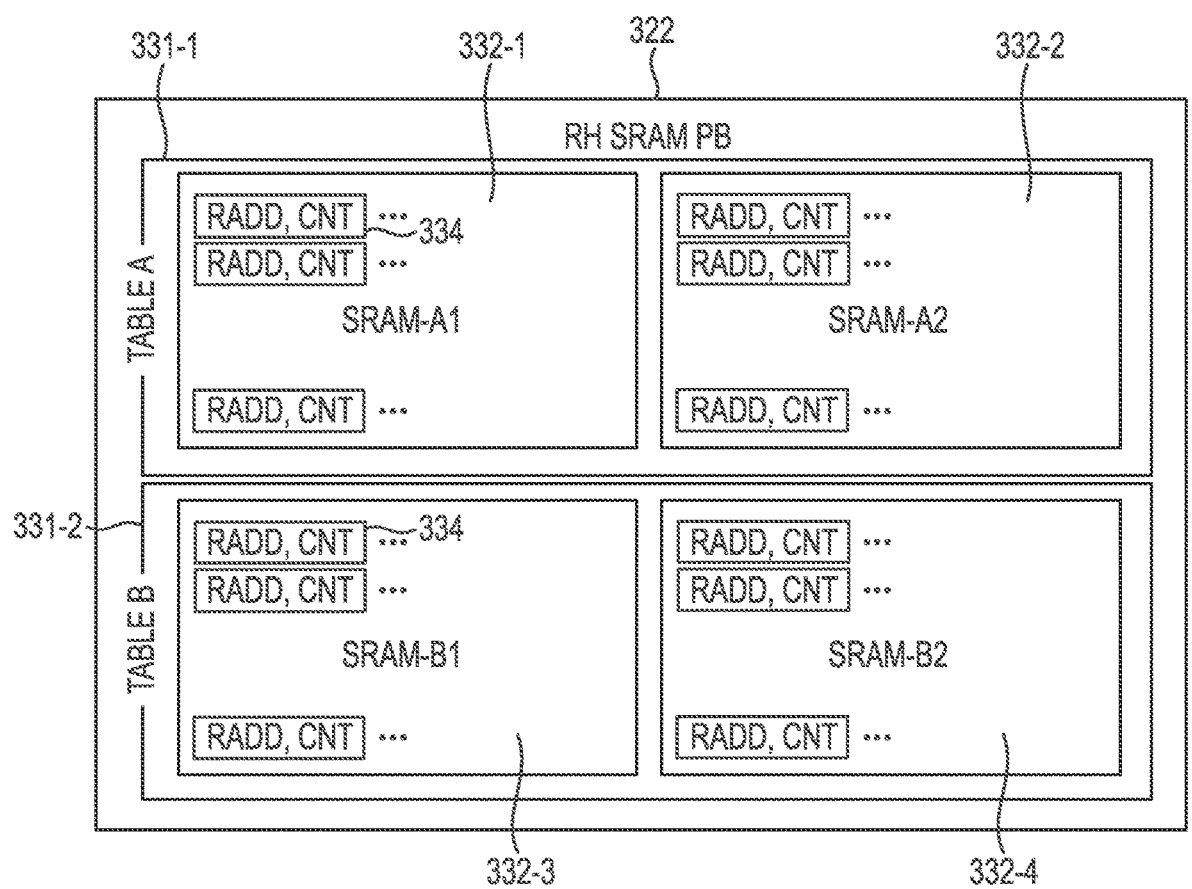
FIG. 3 is a block diagram of a memory of the back-end in accordance with some embodiments of the present disclosure.

FIG. 3 is a block diagram of a memory 322 of the back-end in accordance with some embodiments of the present disclosure. The memory 322 can comprise a table 331-1, and a table 331-2. Each of the tables 331-1, 331-2 can comprise a plurality of blocks. For example, the table 331-1 comprises the blocks 332-1, 332-2 while the table 331-2 comprises the blocks 332-3, 332-4. The blocks 332-1, 332-2, 332-3, 332-4 can be referred to as blocks 332.

Each of the blocks 332 can store a plurality of entries 334 where each of the entries 334 comprises a row address (RADD) and a counter (CNT) corresponding to the row address. Each of the blocks can store entries 334 for the same row addresses even though the counters of each of the blocks can have different values.

The minimum amount of memory 322 needed for each memory controller can be calculated with the following formula, $$2 \cdot \frac{2 \cdot tREF - tRFCpb \cdot RefCnt}{tRC \cdot RHT} \cdot n_{banks} \cdot n_{ranks} \cdot \text{entry}_{size},$$

where tREF represents a refresh cycle (e.g., refresh window). tRFCpb represents a per bank refresh cycle time, and RefCnt represents a refresh count. tRC represents a RAS cycle time and RHT represents a row hammer threshold. $n_{banks}$ represents a number of banks of the memory device, $n_{ranks}$ represents a number of ranks of the memory device, and entry_size represents a size of each entries 334 of the memory 222.

The refresh cycle describes a window in which counters and/or memory cells are refreshed. For example, a refresh cycle can be 64 ms. Given that there are two counters per row address tracked, both counters can be reset every 128 ms if the refresh windows are consecutive. For example, the first counter can be reset at 64 ms while the second counter is reset at 128 ms. The counters of the memory 32 can be reset in phases. In a first phase counters stored in a first table of the memory 322 can be reset while in a second phase counters stored in a second table of the memory 322 can be reset. The first phase and the second phase combined can last 128 ms. The first phase spans from 1 ms to 64 ms while the second phase spans from 65 ms to 128 ms.

When configured in StdRAS, the number of independent memory channels and therefore the number of independent memory controllers is sixteen. Each of the memory controllers needs a minimum amount of memory 322 dedicated to tracking rows, as specified by the above formula. When configured as HiRAS, the number of independent memory channels is reduced to three, and the fifteen out of sixteen memory controllers are grouped into three groups of five memory controllers working like one. When configured as HiRAS only one out of the five memory controllers belonging to the same group (LPCK channel) actively track the rows.

In examples where LP5A1 is implemented the following applies:

TABLE 1

| Item | Value |
|---|---|
| tREF | 64 ms |
| tRFCpb | 220 ns |
| tRC | 90 ns |
| RHT | 1600 |
| RefCnt | 16384 |
| n_banks | 16 |
| n_ranks | 1, 2 |
| entry_size | 29 bit |

The minimum memory 322 needed for each memory controller for LP5A1, is summarized in the following table:

TABLE 2

| RAS configuration | Media | Num of Ranks | SRAM per Memory Controller in byte |
|---|---|---|---|
| HiRAS | LP5A1 | 1 | 18245 |
| | | 2 | 36489 |
| StdRAS | | 1 | 97304 |
| | | 2 | 194608 |

In the case of LP5 the following table applies:

TABLE 3

| Item | Value |
|---|---|
| tREF | 64 ms |
| tRFCpb | 140 ns |
| tRC | 60 ns |
| RHT | 1600 |
| RefCnt | 16384 |
| n_banks | 16 |

TABLE 3-continued

| Item | Value |
|---|---|
| n_ranks | 1, 2, 4 |
| entry_size | 29 bit |

The minimum memory 322 needed for each memory controller for LP5, is summarized in the following table:

TABLE 4

| RAS configuration | Media | Num of Ranks | SRAM per MC in byte |
|---|---|---|---|
| HiRAS | LP5 | 1 | 27961 |
| | | 2 | 55922 |
| | | 4 | 111843 |
| StdRAS | | 1 | 149124 |
| | | 2 | 298247 |
| | | 4 | 596494 (287161 with tREFW = 16 ms) |

Table 4 sets a boundary condition of 9.1 MB of memory 322 needed for row tracking for LP5 that is reduced to 4.55 MB by configuring the memory controller to work with a refresh window (tREFW) reduced from 32 ms down to 16 ms.

The memory 322 can store the row address RADD[16:0] and row count CNT[10:0] information and optionally one overflow bit OF[1] for a total of 29 bits per entry 334. A Ping-Pong mechanism can be implemented in the row tracking system and the factor (e.g., 2) in the memory 322 takes this int account. The Ping-Pong mechanism implements two set of counters for each tracked row. The two counters for each tracked row are organized in two tables include tables 331-1, 331-2. The tables can be stored in two sets of memory (e.g., SRAM) including SRAM A and SRAM B.

In various examples, rows can be racked concurrently on each of the memory banks (e.g., equal to n_banks*n_ranks) such that the memory 322 is organized in blocks. The minimum size of memory 322 entries 334 needed for each block (e.g., RH SRAM pb)

$$\text{Size}(RH\ SRAM\ pb) = 2 \cdot \frac{2 \cdot tREF - tRFCpb \cdot RefCnt}{tRC \cdot RHT} \cdot \text{entry\_size}.$$

In the case of LP5A1, the memory 322 (e.g., RH SRAM pb) can have at least 2*840 entries 334, where SRAM-A=840 entries 334 and SRAM-B=840 entries 334. SRAM-A and SRAM-B can be further divided in two blocks SRAM-A1, SRAM-A2 and SRAM-B1, SRAM-B2 of 420 entries 334 each based on implementation needs. Each SRAM entry 334 is 29 bits in size. Parity bit can be added to enhance the reliability.

Figure 4:
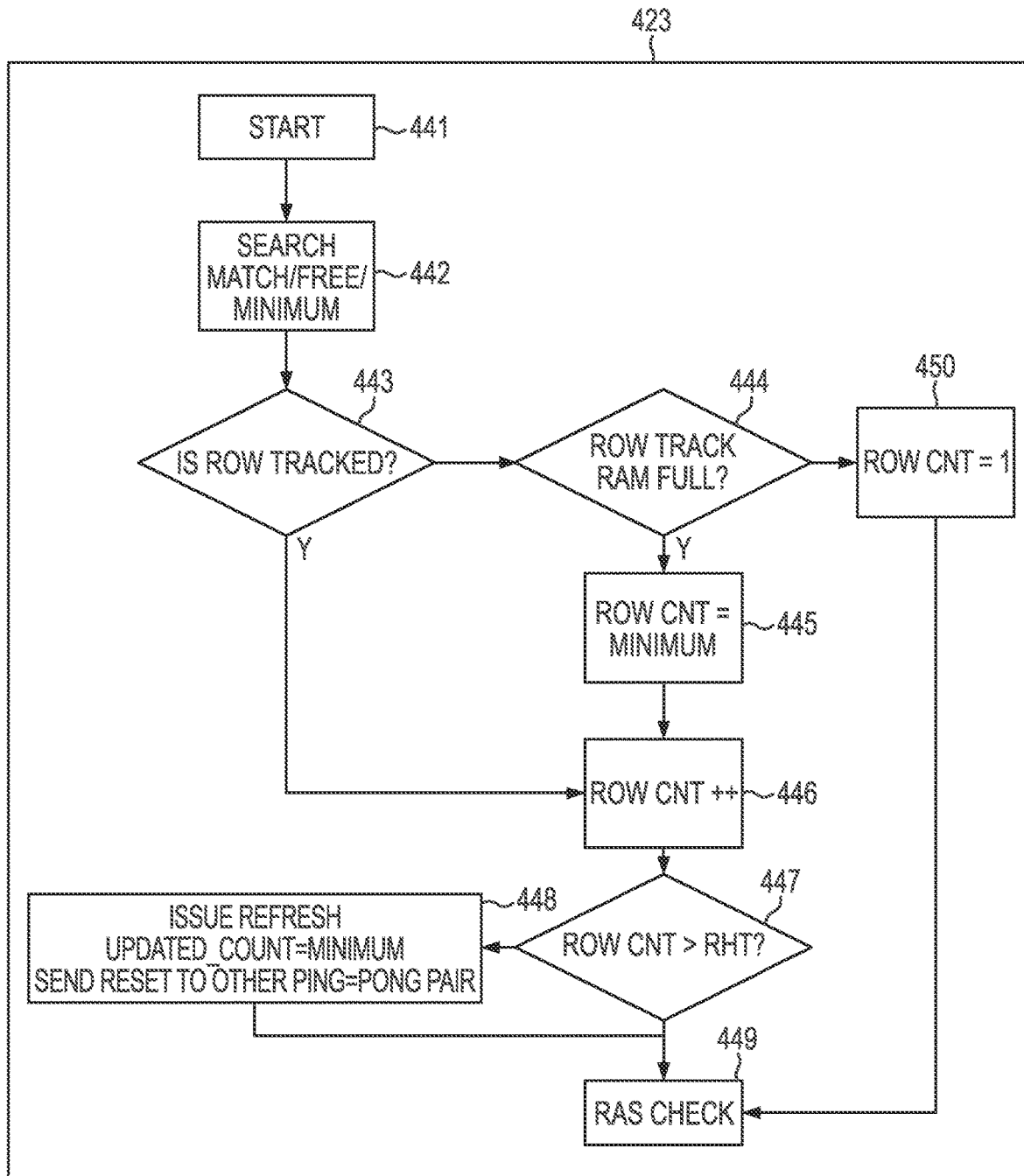
FIG. 4 is a flow diagram corresponding to a row hammer controller in accordance with some embodiments of the present disclosure.

FIG. 4 is a flow diagram corresponding to a row hammer controller in accordance with some embodiments of the present disclosure. The row hammer controller can comprise the circuitry 423. The circuitry 423 can be configured to determine when to refresh rows of memory devices.

At 441, the flow diagram can initiate (e.g., start). The start of the flow diagram can include the receipt of an activation command. For example, the receipt of the activation command at the row hammer controller can initiate the flow diagram. The activation command can be decoded to access a row address corresponding to the activation command. The row address can correspond to a row of a memory device that the activation command activates.

At 442, circuitry 423 of the row hammer controller can utilize the row address to search memory (e.g., memory 322 of FIG. 3) coupled to the row hammer controller. The memory can be searched to determine whether a row address stored in the memory matches (e.g., search match) the row address corresponding to the activation command. For example, the circuitry 423 can compare the row address corresponding to the activation command to the RADD of entries 334 in the memory 322 of FIG. 3. The circuitry 423 can also search for portions of the memory that are not utilized (e.g., Search Free). The circuitry 423 can further search the entries of the memory for an entry having a counter with a value that is the smallest value of the other values stored in other entries of the memory. The circuitry 423 can search for a minimum value stored in the memory.

At 443, a determination can be made as to whether a row is tracked. Specifically, a determination can be made as to whether a row of the memory device having a row address corresponding to the activation command is stored in the memory. If there is a row address stored in the memory that matches a row address corresponding to the activation command then a determination can be made that the row is tracked. If there isn't a row stored in the memory that matches the row address corresponding to the activation command, then a determination can be made that the row is not tracked.

If the row is not tracked, then the flow diagram can continue to 444. If the row is tracked, then the flow diagram can continue to 446. At 444, a determination can be made as to whether the memory is full. The memory is full if every portion of the memory is utilized such that the memory cannot store additional entries without vacating portions of the memory first. If it is determined that the memory is full, then the flow diagram can continue to 445. If it is determined that the memory is not full, then the flow diagram can continue to 450. In various instances, the memory can be deemed not full if the memory can store two entries that are identical to facilitate the Ping-Pong mechanism.

At 450, an entry comprising the row address corresponding to the activation command and a counter with a value equal to 1 can be stored in the free portion of the memory. In various instances, storing the entry in the memory can include storing the entry in multiple portions of the memory to facilitate the Ping-Pong mechanism. For example, the entry can be stored in a first table of the memory and a second table of the memory. Both entries stored in the memory can have a counter value equal to 1. Responsive to storing the entry in the memory, the flow diagram can continue to 449.

At 445, the entry having a counter with a smallest value can be identified. The counter having a smallest value can be a minimum value. The identified entry can be vacated such that the memory is no longer full. Vacating an entry can include vacating a pair of entries that correspond to a same row address. A new entry can be stored in the memory where the new entry has a row address and a counter having the minimum value. The new entry can be a pair of entries that correspond to a same row address. Each of the entries from the pair of entries can comprise the row address and a counter having the minimum value.

Responsive to storing the entries having a minimum value in the memory the flow diagram can continue to 446. At 446, the counters of the entries stored in the memory can be incremented. The counters can be incremented by 1 or by a value greater than 1. The flow diagram can continue to 447.

At 447, a determination can be made as to whether the counters corresponding the entries stored in the memory are greater than an RHT. Each of the entries can be compared to the RHT independent of the other entries. In various examples, each of the entries corresponding to the row address can be compared to the RHT. If one of the entries has a counter having a value that is greater than the RHT, then the flow diagram can continue to 448. If the entries do not have counters that have a value that is greater than the RHT, then the flow diagram can continue to 449.

At 448, the circuitry 423 of the row hammer controller can issue a refresh command. The refresh command can be for a row address corresponding to a row counter that is greater than the RHT. For example, if a counter corresponding to a row address of the activation command is greater than the RHT, then the refresh command can be for the row address. The circuitry 423 can provide the refresh command and/or the row hammer controller can provide the refresh command to the memory controller. The memory controller can provide the refresh command to the memory device which can refresh a row having the row address.

Responsive to issuing the refresh command, the circuitry 423 can update the counter that was greater than the RHT with a value equal to the minimum value identified at 442. The other counters associated with the row address can be reset. For example, if a first counter and a second counter are associated with a row address such that the first entry comprising the first counter also comprises the row address and the second entry comprising the second counter also comprises the row address and if the first counter has a value greater than the RHT, then the first counter can be set to a minimum value identified at 442 while the second counter can be reset. The second counter can be reset to a 0-value. The second counter can also be reset to a minimum value identified at 442. In various instances, the ping-pong pair of counters can be reset to different values or a same value when a refresh command is issued to a corresponding row address. The flow diagram can continue to 449.

At 449, the row counter corresponding the row address of the activation command can be updated based on a duration of time between receipt of the activation command and a subsequent receipt of the pre-charge command. If the duration of time between receipt of the activation command and receipt of the pre-charge command is greater than a threshold, then the corresponding counters can be incremented. The activation command and the pre-charge command can be to a same row address which is the same row address corresponding to the counter. The pre-charge command can be received from the memory controller and can be received at the row hammer controller. Responsive to concluding the RAS check at 449, the flow diagram can continue to 441 to await receipt of a next activation command.

Figure 5:
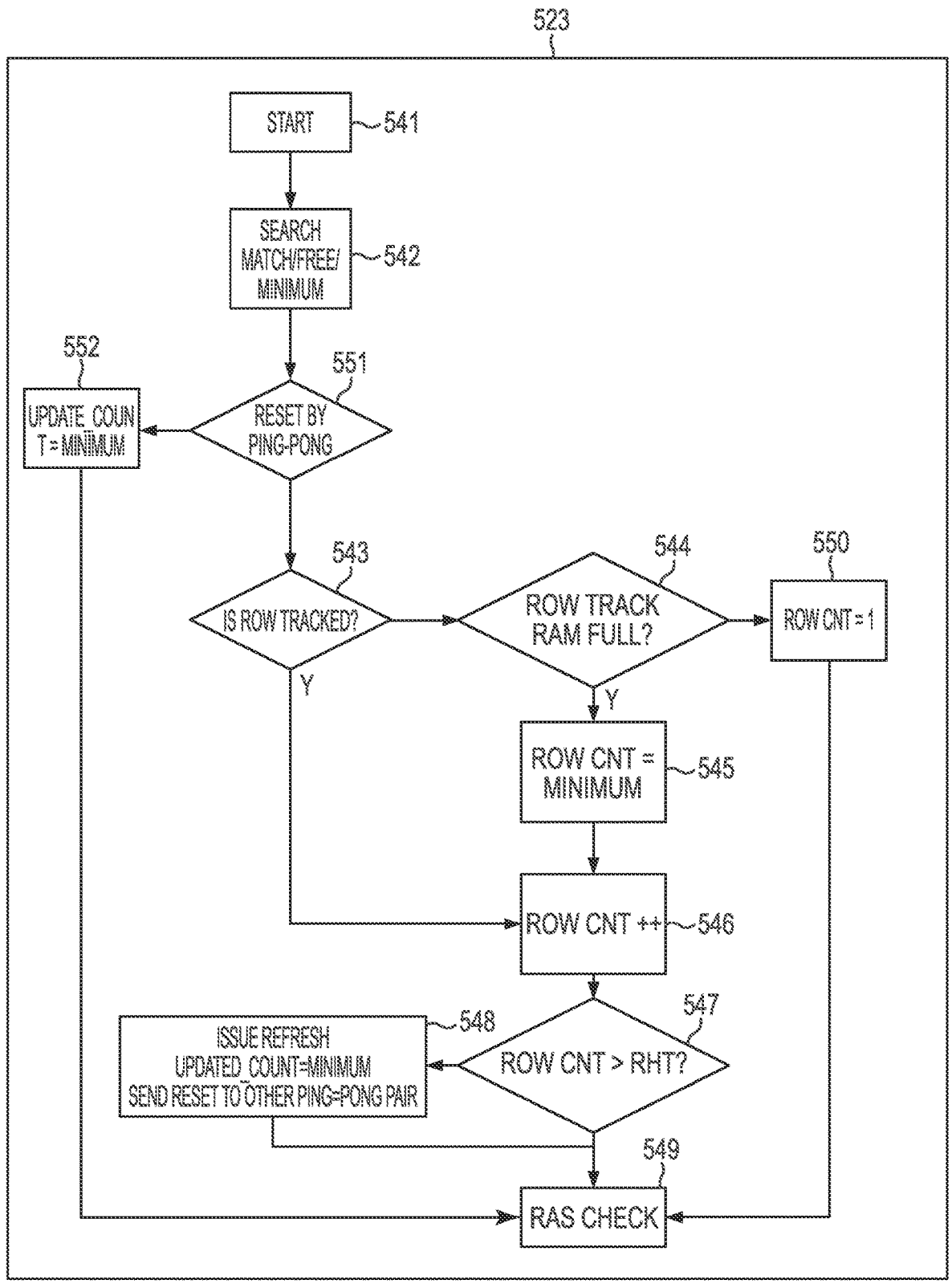
FIG. 5 is a flow diagram corresponding to a row hammer controller in accordance with some embodiments of the present disclosure.

FIG. 5 is a flow diagram corresponding to a row hammer controller in accordance with some embodiments of the present disclosure. The flow diagram can be performed by the circuitry of the row hammer controller. The flow diagram of FIG. 5 is similar to FIG. 4 with the addition of elements of 551 and 552. For example, the elements 541, 542, 543, 544, 550, among others, of FIG. 5 are similar to elements 441, 442, 443, 444, 450 of FIG. 4.

Responsive to comparing the row addresses stored in the memory with the row address received with the activation command to search for the row address at 542, the flow diagram can continue to 551. At 551, a determination can be made as to whether one of the counters corresponding to the row address received with the activation command has been reset. The counters can be reset due to a lapse of time. For instance, each of the counters can be reset after an X duration of time. The resetting of the counters can be misaligned such that the first counter is reset at X1 while the second counter is reset at X2.

If either of counter 1 or counter 2, which correspond to the row address of the activation command, is reset since the last time the flow diagram started at 541, then the reset counter can be updated to have a value equal to a minimum value identified at 542. For instance, if counter 1 was reset since last time the flow diagram was traversed, then at 552 counter 1 can be updated with a minimum value while counter 2 retains its value. The determination made at 551 can be made with regards to a counter corresponding to the row address of the activation command. If the row address of the activation command is not stored in the memory, then the flow chart can continue to 543 because the counter has not been reset due to the Ping Pong mechanism. The counter has not been reset because the counted does not exists. The flow diagram can also continue to 543 if the counter corresponding to the row address of the activation command has not been reset.

Responsive to updating the row counter at 552, the flow diagram can continue to the RAS check at 549. The RAS check at 549 can be conducted as previously described at 449 of FIG. 4 and as is further discussed with regards to FIGS. 6A, 6B. FIG. 5 provides two mechanisms for resetting and/or updating counters. Counters can be reset or updated due to the Ping Pong mechanism. For example, a first counter can be reset and updated due to a lapse of time. The first counter can also be reset and the second counter can be updated due to the first counter being greater than a RHT.

Figure 6A:
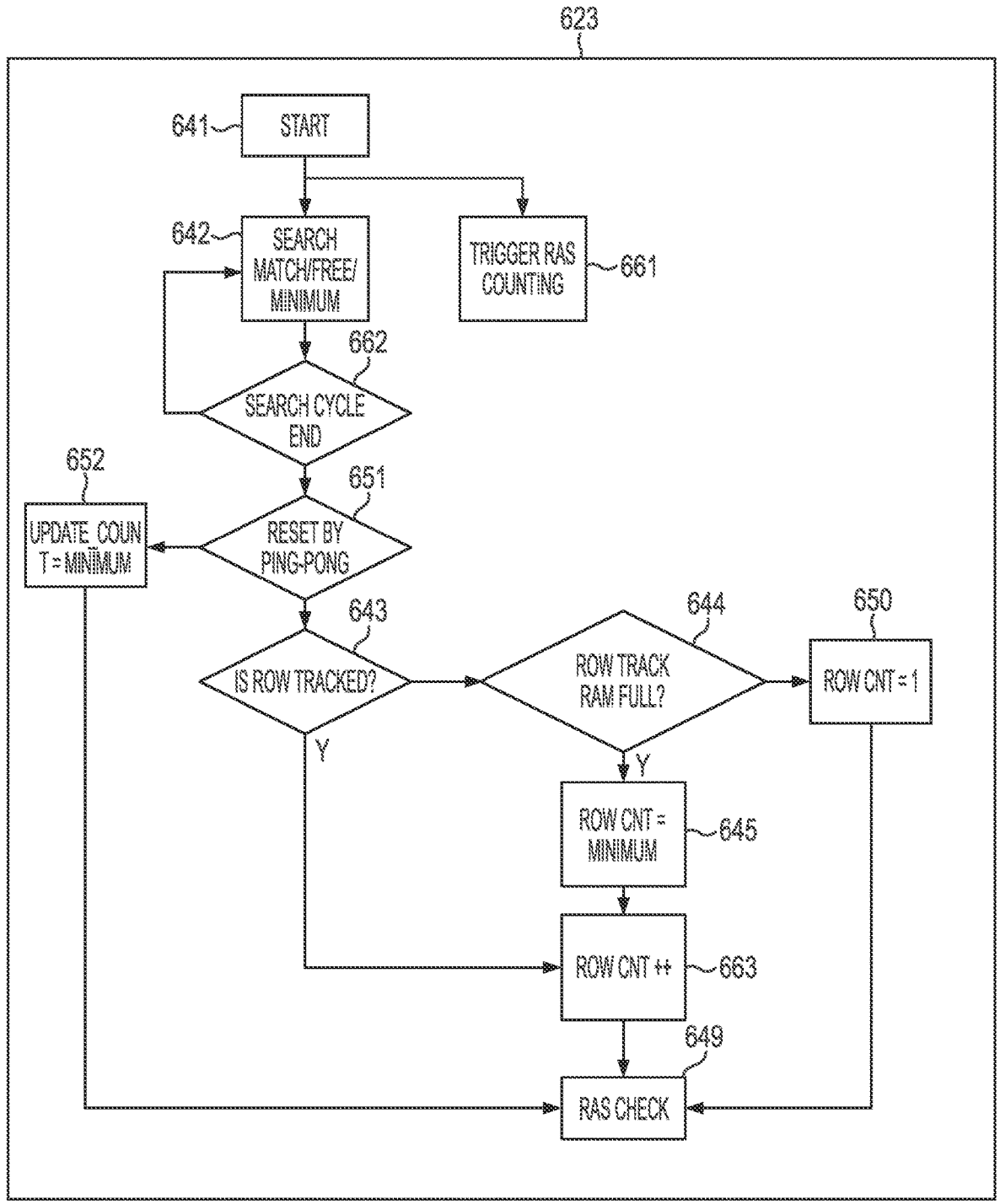
FIG. 6A is a flow diagram corresponding to a row hammer controller in accordance with some embodiments of the present disclosure.
Figure 6B:
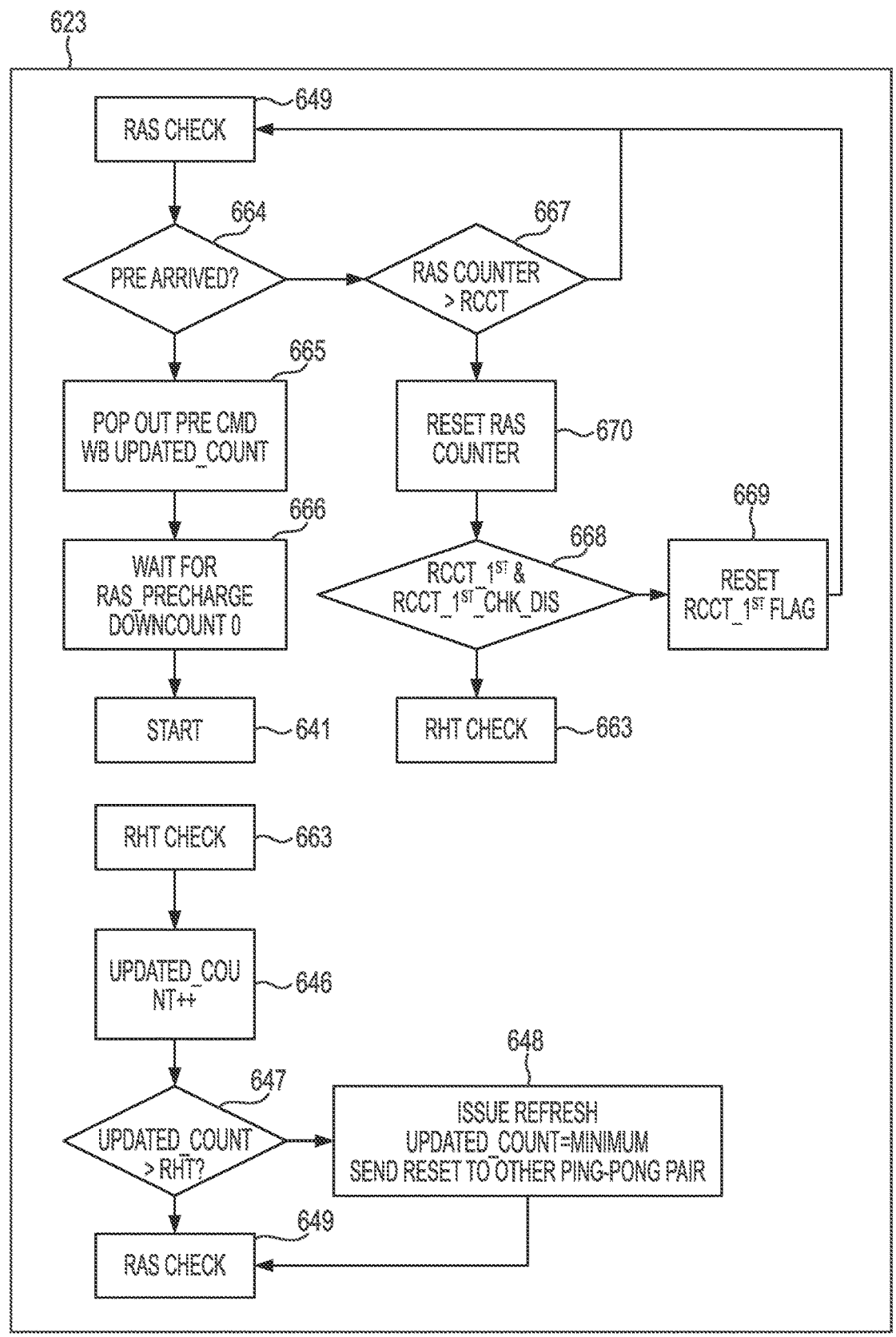
FIG. 6B is a flow diagram corresponding to a row hammer controller in accordance with some embodiments of the present disclosure.

FIG. 6A is a flow diagram corresponding to a row hammer controller in accordance with some embodiments of the present disclosure. The flow diagram of FIG. 6 is similar to FIGS. 4 and 5 with the addition of elements of 661, 662, 663. Element 663 is further described in FIG. 6B. The elements 641, 642, 643, 644, 650, among others, of FIG. 6 are similar to elements 441, 442, 443, 444, 450 of FIG. 4 and elements 541, 542, 543, 544, 550 of FIG. 5.

The flow diagram can start at 641 and continue to 642. At 642, the memory can be searched to identify an entry that matches the row address corresponding to the activation command, free portion of the memory, and/or an entry having a counter with a lowest value (e.g., minimum value).

The flow diagram can continue to 662. At 662, a determination can be made as to whether the search cycle has ended. Determining whether the search cycle has ended is important because it may be detrimental to update the counters at 652 responsive to the determination made at 651 if the search cycle has not concluded. If the search cycle has not ended, then the flow diagram can return to 642 until the search cycle has concluded. Once the search cycle concludes, the flow diagram can continue to 651 as previously described in at 551 of FIG. 5.

Responsive to receipt of the activation command and the start of the flow diagram at 641, the flow diagram can continue to 661. At 661, a RAS counter can be triggered. Triggering the RAS counter can include setting the RAS counter to a particular value such as 0. The RAS counter can be stored in memory and/or in a different register of the back-end. For example, the RAS counter can be stored in the row hammer controller, a circuitry 623 of the row hammer controller, and/or a memory controller. A single RAS counter can suffice in contrast to the plurality of counters (e.g., row counters) that are tracked utilizing the memory. In various examples, the quantity of RAS counters can be less than the quantity of counters (e.g., row counters). Triggering the RAS counter can include setting the RAS counter to a value equal to 0 or 1, for example. The RAS counter can be further updated at the 649 when conducting the RAS check.

Responsive to determining that a row is tracked at 643 and responsive to setting a row counter to a minimum value at 645, the flow diagram can continue to the RHT check at 663. The RHT check is further described in FIG. 6B. The RHT check can be conducted a single time per iteration of the flow diagram or can be conducted multiple times per iteration of the flow diagram. The RHT check can be conducted a single time each time the flow diagram starts at 641. The RHT check has a potential to be conducted multiple times if the limitation that the RHT check be performed a single time per iteration of the flow diagram is not observed. The RAS check at 649 can cause the RHT check at 663 to be conducted in a circular loop if there is not limitation that the RHT check be conducted a single time per iteration of the flow diagram. The RHT check can be performed a single time utilizing a flag. The flag can be set from a first value to a second value after the RHT check is executed. If the flag has a first value, then the RHT check can be performed. If the flag has a second value, then the RHT check can be skipped such that it is not performed. After the RAS check is performed at 649, the flow diagram can await for a receipt of an additional activation command to start the flow diagram anew at 641.

FIG. 6B is a flow diagram corresponding to a row hammer controller in accordance with some embodiments of the present disclosure. The flow diagram of FIG. 6A can continue to FIG. 6B. For example, the RAS check at 649 of FIG. 6A can correspond to the RAS check at 649 of FIG. 6B and the RHT check at 663 of FIG. 6A can correspond to the RHT check at 663 of FIG. 6B.

Responsive to updating, at 645, the row count with a minimum value identified at 642 of FIG. 6A, the RAS check can be initiated at 649 and can continue to 664. At 664, a determination can be made as to whether a pre-charge command has been received. The pre-charge command can be received from the memory controller at the row hammer controller. In various instances, an indication of the pre-charge command can be received at the row hammer controller. The pre-charge command can be decoded to determine whether a row address corresponding to the pre-charge command matches a row address of the activation command received by the row hammer controller. If the row address corresponding to the pre-charge command matched the row address corresponding to the activation command, then the flow diagram can continue to 665. If the row address corresponding to the pre-charge command does not match the row address corresponding to the activation command, then the flow diagram can continue to 667.

At 667, a determination can be made as to whether the RAS counter is greater than the RCCT. The RCCT is a threshold corresponding to the RAS counter. The RAS counter and the row counter can be different counters. The RAS counter can be utilized to increment the row counter. For example, the row counter can be incremented if the RAS counter is greater than the threshold (e.g., RCCT). If the RAS counter is greater than the RCCT, then the flow diagram can continue to 670. If the RAS counter is not greater than the RCCT, then the flow diagram can continue to 649. Each time the RAS counter is compared to the RCCT to determine whether the RAS counter is greater than the RCCT the RAS counter can be incremented. In various instances, the RAS counter can be incremented prior to comparing the RAS counter to the RCCT or the RAS counter can be incremented after comparing the RAS counter to the RCCT. The RAS counter can be incremented by 1 or can be incremented by a different value.

The circuitry 623 can comprise a loop that can be used to increment a counter. The loop can comprise the elements 649, 664, 667. Each time the pre-charge command has not arrived and the RAS counter is less than the RCCT, the RAC counter can be incremented and the flow diagram can return to 649. The duration of time between determining whether the pre-charge command has arrived and determining that the RAS counter is less than the RCCT can be utilized to increment the RAS counter which can be utilized to increment a row counter such that the duration of time between receipt of the activation command and the pre-charge command can be used to adjust the row counter. The row counter can be adjusted at 646.

At 670, the RAS counter can be reset responsive to determining that the RAS counter is greater than the RCCT. Resetting the RAS counter can include setting the value of the RAS counter to 0 or 1. Responsive to resetting the RAS counter, the flow diagram can continue to 668.

At 668, a determination can be made as to whether it is the first time that the RAS counter is greater than RCCT (e.g., RCCT_$1^{st}$ & RCCT_$1^{st}$ chk_dis). Responsive to determining that it is the first time that the RAS counter is greater than RCCT, the flow diagram can continue to 669. At 669, a flag can be set (e.g., reset RCCT_$1^{st}$ flag) to indicate that the RAS counter has been greater than the RCCT at least once. The flag can be used to determine whether it is the first time that the RAS counter is greater than the RCCT or whether it is a subsequent time that the RAS counter is greater than the RCCT. The flag can be reset to indicate that the RAS counter has not been identified as greater than the RCCT at 641 prior to reverting to the start of the flow diagram. Responsive to setting the flag to indicate that the RAS counter has been greater than the RCCT at least once the flow diagram can continue to 649. The flag set at 669 can be utilized at 668 to determine whether it is the first time that the RAS counter has been greater than the RCCT. Responsive to determining that the RAS counter has been greater than the RCCT more than once, the flow diagram can continue to the RHT check 663.

In various instances, responsive to resetting the RAS counter at 670, the flow diagram can continue to 663 without checking whether it is the first time the RAS counter is greater than the RCCT at 668. The determination made at 668 and the setting/resetting of the flag at 669 and 641 can be an option that is programmed/selected based on the desired function of the circuitry 623.

At 665, a determination can be made as to whether the pre-charge command is an auto pre-charge command. For example, the pre-charge command can be a read or write auto pre-charge command. The read or write auto pre-charge command can be performed by performing a column read or write and then closing/pre-charging the row. If the pre-charge command is an auto pre-charge command, then the flow diagram can continue to 666. If the pre-charge command is not an auto pre-charge command, then the flow diagram can continue to 641. At 666, a predetermined duration of time can be waited (e.g., wait for ras_precharge downcount 0) prior to proceeding to 641. The determination made at 665 and the countdown performed at 666 are optional and may not be utilized if the circuitry 623 is configured to not utilize the determination performed at 665 and to not perform the countdown at 666. Rather, the flow diagram can continue from 664 to 641.

At 663, the RHT check can be initiated. At 646, the counter (e.g., row counter) can be incremented. The RAS counter which can is linked to the duration of time between receipt of the activation command and the pre-charge command can be utilized to increment the row counter. Responsive to incrementing the row counter at 646, the flow diagram can continue to 647.

At 647, the row counter can be compared to the RHT. If the row counter is greater than the RHT, then the flow diagram can continue to 648. If the row counter is not greater than the RHT, then the flow diagram can continue to 649. At 648, a refresh command can be issued, the row counter can be updated to have a minimum value identified at 642 of FIG. 6A, and the ping-pong pair of the counters can be reset to a value equal to 1 or 0. Comparing the row counter to the RHT at 647 can include comparing both row counters corresponding to a same row address. If either of the row counters is greater than the RHT, then the flow diagram can continue to 648. The row counter that is updated to have a minimum value is the row counter, from the pin pong pair, that is greater than the RHT. The row counter, from the ping pong pair, that is not greater than the RHT can be reset to have a value equal to 0 or 1. Responsive to issuing the refresh command, the flow diagram can continue to 649. The refresh command can be provided for a row or a bank having the row address corresponding to the row counter. For example, the entry in the memory that comprises the row address and the row counter that is greater than the RHT can be used to identify the row address. Once the row address is identified, the refresh command can be issued to the row address. In various examples, the refresh command can refresh a bank of the memory device, where the bank comprises the row address, or can refresh a plurality of banks of the memory device, where one of the banks of the plurality of banks comprises the row address. The refresh command can refresh a row of the memory device, where the row has the row address, or can refresh a plurality of rows of the memory device, where one of the rows of the plurality of rows comprises the row address.

In various examples, RAS check and the RHT check can comprise a loop. For instance, the RAS check can cause the RHT check to be initiated if the RAS counter is greater than the RCCT at 667. The RHT check can cause the RAS check to be initiated each time the RHT check is initiated at 663. The RAS check can cause the RHT check to be initiated until the pre-charge command arrives at which time the loop is broken.

FIG. 7 is a block diagram of a back-end 701 of a memory sub-system in accordance with some embodiments of the present disclosure. The back-end 701 shown in FIG. 7 illustrates one possible configuration of memory controllers, row hammer controllers, and channels of the back-end 701. The back-end 701 can include error managers 771-1, 771-2, 771-3. The back-end 701 can also comprise channels 724-1, 724-2, 724-3 such that the example of FIG. 7 comprises three channels.

The channels 724-1, 724-2, 724-3 can be referred to as channels 724. Each of the channels 724 can comprise memory controllers 716-1, . . . , 716-5, referred to generally as memory controllers 716, and row hammer controllers 713-1, . . . , 713-5, referred to generally as row hammer controllers 713. Each of the channels 724 can also comprise memory 722-1, . . . , 722-5 referred to generally as memory 722.

The error managers 771-1, 771-2, 771-3, referred to generally as error managers 771, can be configured to perform error correction utilizing the encoders 772, the decoders 773, the error correction encoders 774-1, 774-2, 774-3, 774-4, 774-5, the error correction decoders 775-1, 775-2, 775-3, 775-4, 775-5, the command queues 777, and the alignment buffers 776. The error correction encoders 774-1, 774-2, 774-3, 774-4, 774-5 can be referred to as error correction encoders 774. The error correction decoders 775-1, 775-2, 775-3, 775-4, 775-5 can be referred to as error correction decoders 775.

The encoders 772 and the error correction encoders 774 can be utilized encode commands provided to the channels. Each of the error correction encoders 774 can encode commands for a different one of the memory controllers 716. For instance, the error correction encoder 774-1 can encode commands provided to the memory controller 716-1 while the error correction encoder 774-5 encodes commands provided to the memory controller 716-5.

The decoders 773 and the error correction decoders 775 can decode data provided from the memory controllers 716-1 utilizing the alignment buffer 776. The alignment buffer 776 and the command queue 777 can be utilized to align the data received from the memory controllers 716. The back-end channels 724 can include an APB hub 778.

FIG. 7 shows that each of the channels 724 of the back-end 701 can comprise multiple memory controllers 716, multiple row hammer controllers, and memory 722. FIG. 7 also shows the alignment of the encoding and decoding circuitry of the error managers 771 relative to the channels 724, the memory controllers 716, the row hammer controllers 713, and the memory 722.

In various instances, the back-end channels 724 are independent of each other. However, the memory controllers 716 may be aligned to allow the memory controllers 716 to function appropriately. The alignment of the memory controllers 716 may be facilitated by the alignment buffer 776 and the alignment detector.

In various examples, the row hammer controllers 713 can perform row based activation monitoring. The row hammer controllers 713 can generate bank/row based refresh requests (e.g., bank/row based refresh commands) and provide the requests to the memory controllers 716. The row hammer controllers 713 can provide row hammer information along with the request. The row hammer information can include a value of the row counters (e.g., pin pong pair of row counters), a value of the RAS counter, the row address, and/or information regarding the other entries stored in the memory 722. The row hammer controllers 713 can also generate and provide a bank/row based activation stop or clear request to the memory controllers 716. The activation stop or clear requests can cause the activation request to be stopped or cleared such that the activation command is not implemented on the memory devices. The stop activation request as well as the close activation request can be utilized to stop an activation or a row of the memory device as well as close a row/bank of memory device.

Although the examples described herein are provided in terms of the rows, the examples described herein can also be applied to banks. For example, the controllers 713 can be configured to monitor banks of the memory device instead or rows of the memory device. The circuitry 223, of FIG. 2, can be configured to implement the flow diagrams shown in FIGS. 4, 5, 6A, and 6B, on banks of the memory devices instead of rows of the memory devices.

The memory controller 716 can be configured to provide bank/row based information to the row hammer controllers 713. For example, the memory controller 716 can provide activation information corresponding to the activation commands received by the memory controller 716. The memory controller 716 can provide refresh information corresponding to refresh commands provided by the memory controller 716 to the memory devices. For instance, if the memory controller 716 provides a refresh command to the memory devices without being prompted by the row hammer controllers 713, the memory controller 716 can provide the refresh information to the row hammer controllers 713. The row hammer controllers 713 can utilize the refresh information to reset the ping pong pair of counters corresponding to the refresh information (e.g., pint pong pair of counters having an address corresponding to the refresh information). The row hammer controllers 713 can utilize refresh information to reset the RAS counter, the RCCT flag, and/or other variables of the flow diagrams described herein. The memory controllers 716 can further configured to provide auto pre-charge information and/or pre-charge information corresponding to the auto pre-charge commands and/or pre-charge commands to the row hammer controllers 713.

The memory controllers 716 can further stop activation of rows/banks of the memory devices based on requests received from the row hammer controller 713. The memory controllers 716 can close banks to specific banks/rows if activated a quantity of times greater than the RHT as defined by the row hammer controller 713. The memory controllers 716 can issue refresh commands based on the row hammer controller's requests to specific banks/rows of the memory devices.

Figure 8:
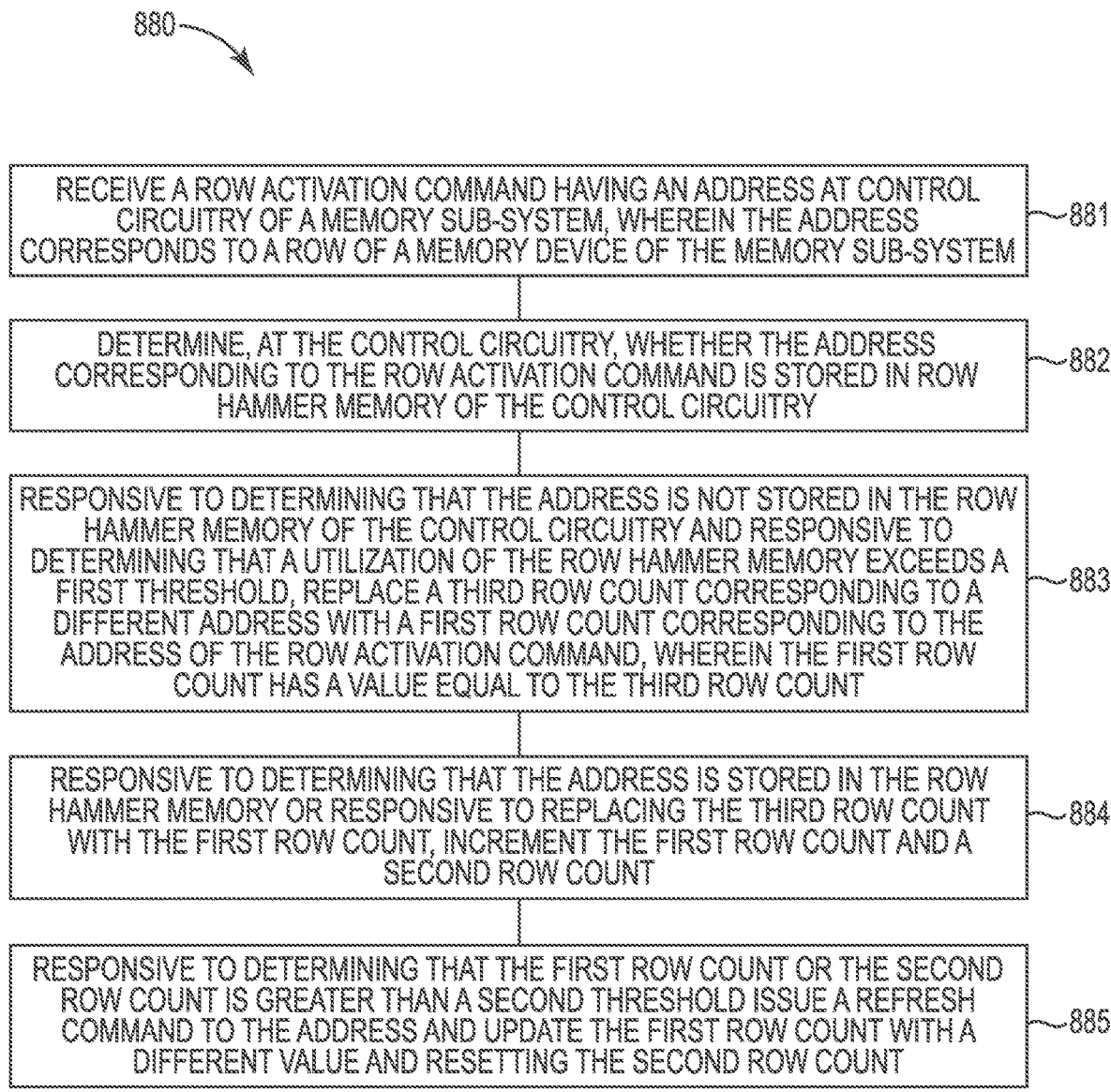
FIG. 8 is a flow diagram corresponding to a method for refreshing rows in accordance with some embodiments of the present disclosure.

FIG. 8 is a flow diagram corresponding to a method 880 for refreshing rows in accordance with some embodiments of the present disclosure. The method 880 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 880 is performed by the row hammer controllers 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 881, a row activation command having an address can be received at control circuitry of a memory sub-system, wherein the address corresponds to a row of a memory device of the memory sub-system. At operation 882, a determination can be made, at the control circuitry, as to whether the address corresponding to the row activation command is stored in row hammer memory of the control circuitry. At operation 883, responsive to determining that the address is not stored in the row hammer memory of the control circuitry and responsive to determining that a utilization of the row hammer memory exceeds a first threshold, a third row count corresponding to a different address can be replaced with a first row count corresponding to the address of the row activation command, wherein the first row count has a value equal to the third row count. The first threshold can be used to determine whether the row hammer memory is full. Determining whether the utilization of the row hammer memory exceeds the first threshold can include determining whether the row hammer memory is full. If the utilization exceeds the first threshold, then the row hammer memory can be identified as being full. If the utilization does not exceed the first threshold, then the row hammer can be identified as not being full.

At operation 884, responsive to determining that the address is stored in the row hammer memory or responsive to replacing the third row count with the first row count, the first row count and a second row count can be incremented. At operation 885, responsive to determining that the first row count or the second row count is greater than a second threshold, a refresh command can be issued to the address and the first row count can be updated with a different value. The second row count can also be reset.

Responsive to determining that the address is not stored in the row hammer memory and responsive to determining that the utilization of the row hammer memory does not exceed the first threshold, the first row count can be stored in the row hammer memory of the control circuitry with a value equal to one. The first row count and the second row count can correspond to the row address. The first row count and the second row count can be reset at different times after a duration of time has elapsed.

In various instances, determining whether the address that corresponds to the row activation command is stored in the row hammer memory may further comprise, responsive to determining that the address is not stored in the row hammer memory, identifying the second row count that has a lowest value as compared to other row counts stored in the row hammer memory. Responsive to determining that the address is not stored in the row hammer memory and responsive to determining that the utilization of the row hammer memory exceeds the first threshold, the third row count corresponding to the different address can be replaced with the first row count corresponding to the address of the row activation command. The first row count can have a value equal to the lowest value at a time the first row count replaces the third row count.

Responsive to determining whether the first row count or the second row count is greater than the second threshold, a determination can be made as to whether the first row count and the second row count is to be updated based on an arrival of a pre-charge command that corresponds to the activation command. The first row count and the second row count can be incremented based on a duration of time between receipt of the pre-charge command and receipt of the activation command. The first row count and the second row count can be incremented responsive to the duration of time being greater than a third threshold. In various instances, determining that the utilization of the row hammer memory exceeds the first threshold can include determining that the row hammer memory is full.

In various examples, a back-end of a memory sub-system controller can be coupled to the plurality of memory devices. The back-end can comprise a plurality of memory controllers and a plurality of row hammer controllers. The row hammer controller can correspond to respective memory controllers of the plurality of memory controllers. Each of the plurality of row hammer controllers can be coupled to one of a plurality of row hammer memories. Each row hammer memory can be configured to store a first count and a second count corresponding to a same row address of a memory device to which the corresponding memory controller is coupled.

Each of the plurality of row hammer controllers can access a row activation command, from the corresponding memory controller, having an address of a row of the memory device. Each of the row hammer controllers can determine whether the address corresponding to the row activation command is stored in a corresponding row hammer memory. Responsive to determining that the address is stored in the corresponding row hammer memory and that either of the first count and the second count have been reset in a previous duration of time, each of the row hammer controllers can update at least one of the first count and the second count.

Responsive to determining that the address is not stored in the corresponding row hammer memory and responsive to determining that a utilization of the corresponding row hammer memory exceeds a first threshold, a different count corresponding to a different address can be reset with the first count corresponding to the address of the row activation command, where the first count has a value equal to a different value of the different count. Responsive to determining that the address is stored in the corresponding row hammer memory or responsive to replacing the different count with the first count, the first count and the second count can be incremented. Responsive to determining that the first count or the second count is greater than a second threshold, a refresh command can be issued to the row address. Responsive to determining that the first count or the second count is greater than the second threshold, the first count can be updated with a different value. Responsive to determining that the first count or the second count is greater than the second threshold, the second count can be reset.

In various examples, responsive to determining that the first count or the second count is greater than the second threshold, the first count can be updated with a minimum value of counts stored in the row hammer memory. The minimum value of counts can correspond to other row of the corresponding memory device.

Each of the plurality of row hammer controllers can further be configured to, responsive to determining that the first count or the second count is greater than the second threshold, issue the refresh command to refresh a single row of the memory device having the row address. That is, a single row can be refreshed at a time as opposed to multiple rows refreshed at the same time. Each of the plurality of row hammer controllers can further be configured to, responsive to determining that the first count or the second count is greater than the second threshold, reset the second count to have a default value. For example, the single row can be refreshed and the second count can be reset. Each of the plurality of row hammer controllers can further be configured to issue the refresh command by providing a signal to the corresponding memory controller to cause the corresponding memory controller to issue the refresh command to the memory device.

In various instances, a row hammer controller can be coupled to a memory controller of a back-end of a memory sub-system controller. The row hammer controller can be coupled to a row hammer memory. The row hammer memory can store a first count and a second count that correspond to a same row address of a memory device coupled to the memory controller.

The row hammer controller can access a row activation command, from the memory controller, having an address of a row of the memory device. The row hammer controller can also determine whether the address corresponding to the row activation command is stored in row hammer memory.

The row hammer controller can, responsive to determining that the address is stored in the row hammer memory and that either of the first count and the second count have been reset in a previous duration of time, update at least one of the first count and the second count. The row hammer controller can further, responsive to determining that the address is not stored in the row hammer memory and responsive to determining that a utilization of the memory of the control circuitry exceeds a first threshold, replace a third row count corresponding to a different address with the first count corresponding to the address of the row activation command, where the first count has a value equal to the third row count.

Responsive to determining that the address is stored in the row hammer memory or responsive to replacing the third row count with the first count, the first count and the second count can be incremented. Responsive to incrementing the first count and the second count, a determination can be made as to whether the first count or the second count is greater than a second threshold. Responsive to determining that the first count or the second count is greater than the second threshold, a refresh command can be issued to the row address and the first count can be updated with a different value. The second counter can also be reset. Responsive to issuing the refresh command to the row address or determining that the first count and the second count is not greater than the second threshold, a determination can be made as to whether to increment the first count and the second count based on a duration of time that elapsed between a receipt of the row activation command and a corresponding pre-charge command.

The row hammer controller can determine whether the corresponding pre-charge command has been received. Responsive to determining that the corresponding pre-charge command was received, a determination can be made as to whether the corresponding pre-charge command is an automatic pre-charge command. Responsive to determining that the pre-charge command is an automatic pre-charge command, the row hammer controller can count down a different duration of time prior to accessing the row activation command. Responsive to determining that the pre-charge command has not been received and responsive to determining that a fourth row count is greater than a third threshold the fourth row count can be reset, the first row count and the second row count can be incremented, and a determination can be made as to whether the pre-charge command has been received. The first row count and the second row count can be incremented in a second iteration of a determination of whether the pre-charge command has been received.

Figure 9:
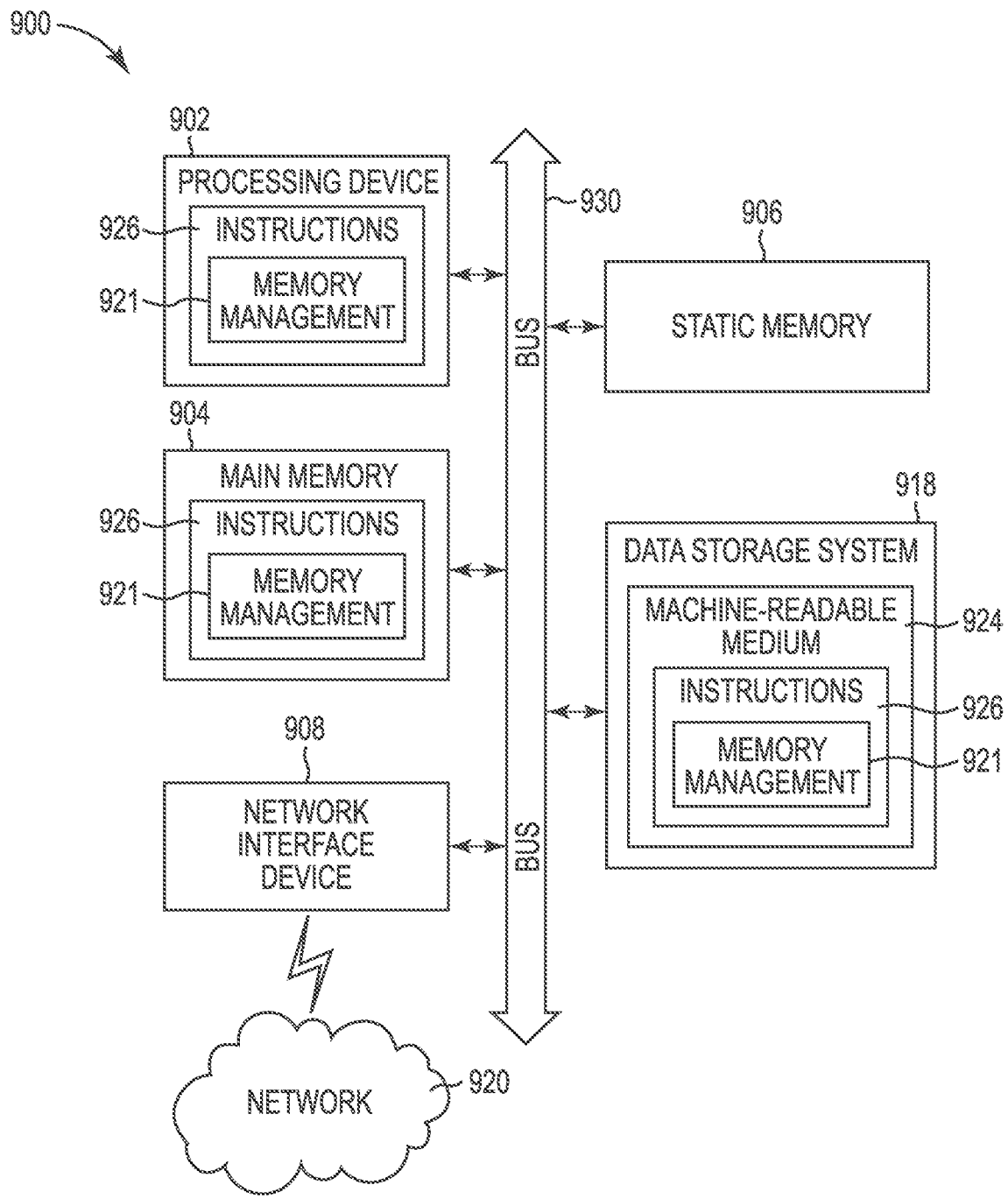
FIG. 9 is a block diagram of an example computer system in which embodiments of the present disclosure may operate.

FIG. 9 is a block diagram of an example computer system 900 in which embodiments of the present disclosure may operate. For example, FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the row hammer controllers 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

The processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a refresh circuitry (e.g., the row hammer controllers 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   receiving a row activation command having an address at control circuitry of a memory sub-system, wherein the address corresponds to a row of a memory device of the memory sub-system;
   determining, at the control circuitry, whether the address corresponding to the row activation command is stored in row hammer memory of the control circuitry;
   responsive to determining that the address is not stored in the row hammer memory of the control circuitry and responsive to determining that a utilization of the row hammer memory exceeds a first threshold, replacing a third row count corresponding to a different address with a first row count corresponding to the address of the row activation command, wherein the first row count has a value equal to the third row count;
   responsive to determining that the address is stored in the row hammer memory or responsive to replacing the third row count with the first row count, incrementing the first row count and a second row count; and
   responsive to determining that the first row count or the second row count is greater than a second threshold:
   issuing a refresh command to the address; and
   updating the first row count with a different value and resetting the second row count.

2. The method of claim 1, further comprising, responsive to determining that the address is not stored in the row hammer memory and responsive to determining that the utilization of the row hammer memory does not exceed the first threshold, storing the first row count in the row hammer memory of the control circuitry with a value equal to one.

3. The method of claim 1, wherein the first row count and the second row count correspond to the row address.

4. The method of claim 1, further comprising resetting the first row count and the second row count at different times after a duration of time has elapsed.

5. The method of claim 1, wherein determining whether the address that corresponds to the row activation command is stored in the row hammer memory further comprises:
   responsive to determining that the address is not stored in the row hammer memory, identify the second row count that has a lowest value as compared to other row counts stored in the row hammer memory.

6. The method of claim 1, wherein responsive to determining that the address is not stored in the row hammer memory and responsive to determining that the utilization of the row hammer memory exceeds the first threshold, replacing the third row count corresponding to the different address with the first row count corresponding to the address of the row activation command, wherein the first row count has a value equal to the lowest value at a time the first row count replaces the third row count.

7. The method of claim 1, further comprising, responsive to determining whether the first row count or the second row count is greater than the second threshold, determining whether the first row count and the second row count is to be updated based on an arrival of a pre-charge command that corresponds to the activation command.

8. The method of claim 7, further comprising incrementing the first row count and the second row count based on a duration of time between receipt of the pre-charge command and receipt of the activation command.

9. The method of claim 1, further comprising incrementing the first row count and the second row count responsive to the duration of time being greater than a third threshold.

10. The method of claim 1, wherein the determination that the utilization of the row hammer memory exceeds the first threshold further comprises determining that the row hammer memory is full.

11. An apparatus, comprising:
a plurality of memory devices; and
a back-end of a memory sub-system controller coupled to the plurality of memory devices and comprising:
a plurality of memory controllers;
a plurality of row hammer controllers coupled to corresponding respective memory controllers of the plurality of memory controllers,
wherein each of the plurality of row hammer controllers is coupled to one of a plurality of row hammer memories,
wherein each row hammer memory is configured to store a first count and a second count corresponding to a same row address of a memory device to which the corresponding memory controller is coupled; and
wherein each of the plurality of row hammer controllers is configured to:
access a row activation command, from the corresponding memory controller, having an address of a row of the memory device;
determine whether the address corresponding to the row activation command is stored in a corresponding row hammer memory;
responsive to determining that the address is stored in the corresponding row hammer memory and that either of the first count and the second count have been reset in a previous duration of time, update at least one of the first count and the second count;
responsive to determining that the address is not stored in the corresponding row hammer memory and responsive to determining that a utilization of the corresponding row hammer memory exceeds a first threshold, replace a different count corresponding to a different address with the first count corresponding to the address of the row activation command, wherein the first count has a value equal to a different value of the different count;
responsive to determining that the address is stored in the corresponding row hammer memory or responsive to replacing the different count with the first count, increment the first count and the second count; and
responsive to determining that the first count or the second count is greater than a second threshold, issue a refresh command to the row address, update the first count with a different value, and reset the second count.

12. The apparatus of claim 11, wherein each of the plurality of row hammer controllers is further configured to, responsive to determining that the first count or the second count is greater than the second threshold, update the first count with a minimum value of counts stored in the row hammer memory.

13. The apparatus of claim 11, wherein each of the plurality of row hammer controllers is further configured to, responsive to determining that the first count or the second count is greater than the second threshold, issue the refresh command to refresh a single row of the memory device having the row address.

14. The apparatus of claim 11, wherein each of the plurality of row hammer controllers is further configured to, responsive to determining that the first count or the second count is greater than the second threshold, reset the second count to have a default value.

15. The apparatus of claim 11, wherein each of the plurality of row hammer controllers is further configured to issue the refresh command by providing a signal to the corresponding memory controller to cause the corresponding memory controller to issue the refresh command to the memory device.

16. An apparatus, comprising:
a row hammer controller, coupled to a memory controller of a back-end of a memory sub-system controller, coupled to a row hammer memory configured to store a first count and a second count, wherein the first count and the second count correspond to a same row address of a memory device coupled to the memory controller;
wherein the row hammer controller is configured to:
access a row activation command, from the memory controller, having an address of a row of the memory device;
determine whether the address corresponding to the row activation command is stored in row hammer memory;
responsive to determining that the address is stored in the row hammer memory and that either of the first count and the second count have been reset in a previous duration of time, update at least one of the first count and the second count;
responsive to determining that the address is not stored in the row hammer memory and responsive to determining that a utilization of the memory of the control circuitry exceeds a first threshold, replace a third row count corresponding to a different address with the first count corresponding to the address of the row activation command, wherein the first count has a value equal to the third row count;
responsive to determining that the address is stored in the row hammer memory or responsive to replacing the third row count with the first count, increment the first count and the second count;
responsive to incrementing the first count and the second count, determine whether the first count or the second count is greater than a second threshold;
responsive to determining that the first count or the second count is greater than the second threshold, issue a refresh command to the row address and update the first count with a different value and reset the second counter; and
responsive to issuing the refresh command to the row address or determining that the first count and the second count is not greater than the second threshold, determine whether to increment the first count and the second count based on a duration of time that elapsed between a receipt of the row activation command and a corresponding pre-charge command.

17. The apparatus of claim 16, wherein the row hammer controller is further configured to determine whether the corresponding pre-charge command has been received.

18. The apparatus of claim 17, wherein the row hammer controller is further configured to, responsive to determining that the corresponding pre-charge command was received, determine whether the corresponding pre-charge command is an automatic pre-charge command.

19. The apparatus of claim 18, wherein the row hammer controller is further configured to, responsive to determining that the pre-charge command is an automatic pre-charge command, count down a different duration of time prior to accessing the row activation command.

20. The apparatus of claim 17, wherein the row hammer controller is further configured to, responsive to determining that the pre-charge command has not been received and responsive to determining that a fourth row count is greater than a third threshold:
- reset the fourth row count;
- increment the first row count and the second row count;
- determine whether the pre-charge command has been received; and
- wherein the row hammer controller is further configured to increment the first row count and the second row count in a second iteration of a determination of whether the pre-charge command has been received.

* * * * *